Sept. 1, 1964 B. L. DANNER 3,146,577

TELEPHONE TIMER

Filed Aug. 20, 1962 3 Sheets-Sheet 1

INVENTOR.
Barry L. Danner

BY

Prangley, Baird, Clayton, Miller & Vogel.
Attys.

Sept. 1, 1964 B. L. DANNER 3,146,577

TELEPHONE TIMER

Filed Aug. 20, 1962 3 Sheets-Sheet 2

INVENTOR.
Barry L. Danner

BY

Brangley, Baird, Clayton, Miller & Vogel
Attys.

INVENTOR.
Barry L. Danner
BY
Brangby, Baird, Clayton, Miller & Vogel.
Attys.

United States Patent Office 3,146,577

Patented Sept. 1, 1964

3,146,577

TELEPHONE TIMER

Barry L. Danner, 3950 Lake Shore Drive, Chicago, Ill.

Filed Aug. 20, 1962, Ser. No. 218,053
3 Claims. (Cl. 58—22.9)

This invention relates to a telephone timer and more particularly to a device having means for manually pre-selecting the desired time interval for any particular call, means for instantaneously starting the timer on the answering of the telephone by the called party and providing an audible signal to the calling party of the approach of the end of the pre-selected time interval.

Telephone calls, particularly in the metropolitan areas are largely, if not entirely, based on time according to pre-established "message units" for the type of service possessed or utilized by the calling party, or the called party in some instances. The basic time allotment for any telephone call varies with the locality and the type of call and the charge for any call varies with the number of "message units" encompassed within the basic or initial time interval and the number of message units encompassed within the first additional or overtime interval and the number of subsequent additional or overtime intervals, or fractions thereof, included within the total time period of each particular call.

In some metropolitan areas, the message unit is one call between phones within a certain metropolitan zone or area for which the charge made varies with the type of service and the number of calls previously made within that zone or area in the same month. On calls between zones or areas, the basic charge for any call varies with the number of message units for a call of an initial time interval, or fraction thereof, which may be either three, four or five minutes in duration and the additional charge for calls extending beyond that initial time interval vary with the number of assigned message units for the first overtime interval, or fraction thereof, which may also vary from two to four minutes or more, and the number of message units for additional or subsequent overtime intervals, or fractions thereof, may vary from one to seven.

Long distance calls commonly are charged for on the basis of a three minute initial time interval and from three to five minutes for overtime intervals going beyond the initial time interval. As direct dialing of long distance calls is expanded, more and more extended conversations may be expected since the operators will not be available to interrupt the call or to warn the parties of the expiration of the initial time interval.

Presently the operator completing the call is available to warn the party to be charged of the approaching expiration of the initial time interval, if requested to do so, but that service is frequently not requested because the statement by the operator warning of the approaching elapse of the initial time interval is heard by both parties, and may be regarded as placing a limited value on the worth of the call to the party being charged therefor.

It is, accordingly, an object of this invention to provide a discrete warning device positionally associated against displacement relative to the telephone base or stand and so constructed that the desired time interval for each call may be pre-selected and, if thereafter desired, extended for an additional time period for the same or a different length as the party may desire without in any way interfering with or interrupting the conversation and also so constructed that the timing period may be initiated simultaneously with the answering of the call by the called party.

Other and further objects of the invention are to provide an adjustable telephone time having time pre-selector means and time initiating means forming parts of a common actuator and control means.

Other and further objects and advantages of the invention will be apparent from the following description wherein.

Figures 1, 8, 9:
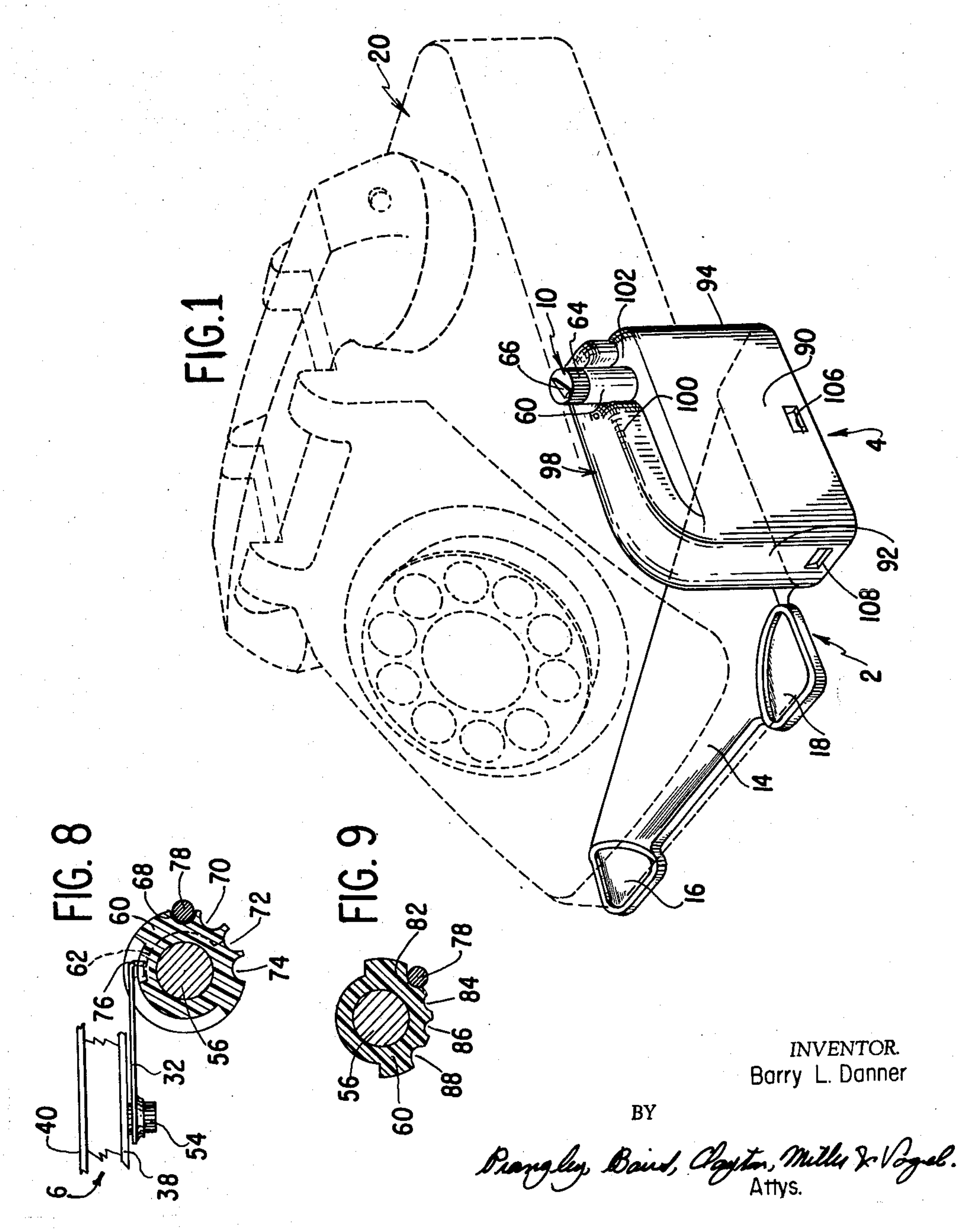
FIGURE 1 is a view in perspective of a telephone timer embodying the invention and illustrating the association thereof with a common hand or desk set illustrated in dashed lines.
FIG. 8 is a fragmentary view in horizontal section taken along the line 8—8 of FIG. 6.
FIG. 9 is a view in horizontal section taken along the line 9—9 of FIG. 6.

As shown in the drawings, a telephone timer embodying the invention may comprise a one-piece molded base 2, a one-piece molded housing or cover 4, a timing mechanism 6, a mechanism support 8, preferably molded integrally with the base 2, a control means, mechanism or actuator means 10 operable in one direction to pre-select the desired time interval and in another direction to initiate operation of the timing mechanism 6, and stop means 12.

The base or support 2 preferably comprises a plate-like member 14 (FIGS. 1 to 3) having spaced sockets 16 and 18 for receiving the two front mounting pads or feet of the base or stand of the conventional telephone desk-set 20 shown in dashed lines in FIG. 1. The base or support 2 is preferably formed of a butyrate plastic and molded integrally with the mechanism support 8, which latter comprises a platform 22 (FIG. 6) raised above the plate-like member 14 and having a depending rim 24 and a support block 26. The platform 22 is formed adjacent to the plate-like member 14 with an integral, vertical mounting plate 28 having a circular recess 30 to receive the timing mechanism 6.

Figure 6:
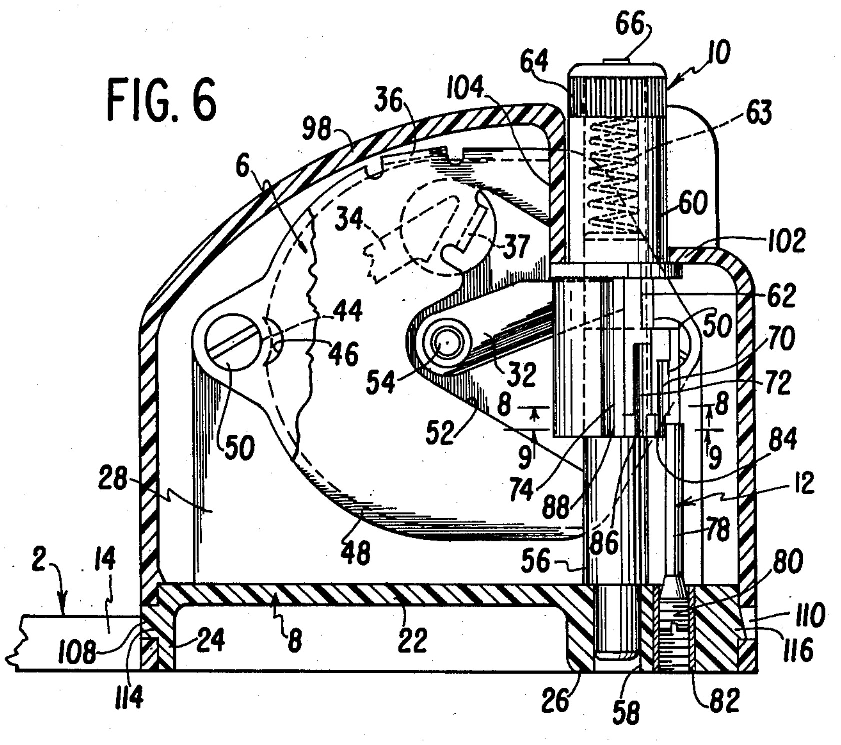
FIG. 6 is an enlarged view in vertical section taken along the line 6—6 of FIG. 2.
Figure 7:
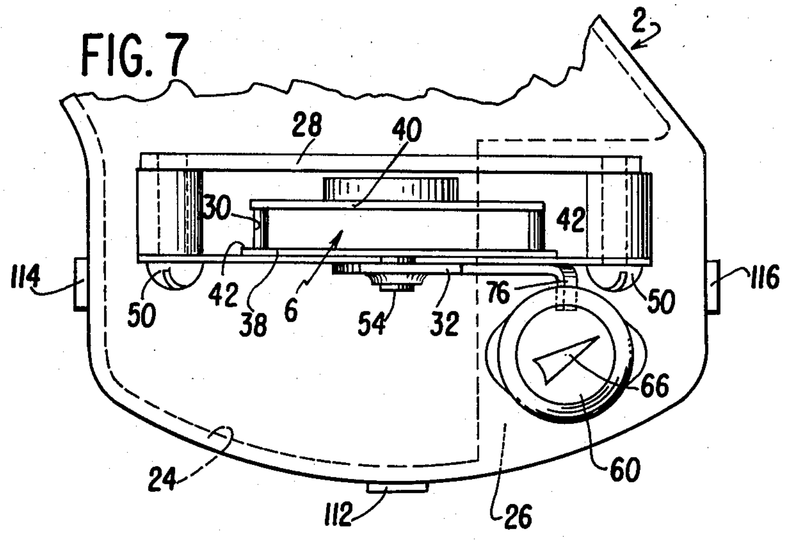
FIG. 7 is a fragmentary view in plan and partly in section of the portion of the timer illustrated in FIG. 6 with the cover removed.

The timing mechanism 6 may be of any suitable type having a crank arm or actuator 32 movable in a clockwise direction, as seen in FIG. 6, to wind the timer spring, not shown, and returnable in a counterclockwise direction, under the action of that spring, to a zero time position. The timing mechanism is provided with a clapper 34 released as the arm 32 approaches the zero position to strike anvils 36 and 37, one or more times, and thereby given an alarm. The timing mechanism also includes front and rear mounting disks or plates 38 and 40, the disk 38 being slightly larger in diameter than the disk 40 and being positioned against an annular shoulder 42 concentric with the recess 30. A small lug 44 divides the shoulder 42 into parts and projects into a notch 46 in the edge of the disk 38 to effect a predetermined positioning of the timing mechanism.

The timing mechanism 6 is secured to the mounting plate 38 by a clamping plate 48 apertured to receive mounting pins or screws 50 press-fitted or threaded into the mounting plate 28. The clamping plate is formed with a segmental cut-out portion 52 to receive the crank arm or actuator 32 of the timing mechanism and is formed with inwardly bent lugs forming the anvils 36 and 37 for the clapper 34.

The details of the internal construction of the timing mechanism 6 are not illustrated since, as previously indicated, they may be of any desirable type providing the desired time period range. It is preferred, however, to use as the timing mechanism 6 a "Memopark" timing device manufactured by Derby S.A., Neuchatel, Switzerland, and having a forty minute total timing range, as illustrated by the scale in FIG. 5, and of a diameter of 30 mm.; a thickness of 4.5 mm.; an alarm clapper, as indicated by the numeral 34, and a crank arm, as indicated by the numeral 32, fixed to the timing shaft 54.

The control means, mechanism, or actuator means 10 comprises a mounting stud 56 having its reduced lower end press-fit or otherwise secured in a hole 58 in the support block 26, a hollow cylinder 60 closed at its upper end is mounted on the stud 56 for slidable movement in the direction axially of the stud and for rotational adjusting movement about said axis. The upper portion of the cylinder 60 is provided with serrations or splines 64 adjacent to the upper closed end of the cylinder to facilitate turning of the cylinder and the upper closed end of the cylinder may be formed, or provided with, an index or pointer 66. The lower portion of the cylinder 60 is provided with angularly spaced, longitudinally extending notches 68, 70, 72 and 74 which, as illustrated in FIG. 8, are generally semi-circular in cross section and of varying lengths, each notch representing a different timing period. The crank arm 32 of the timing mechanism is provided with a laterally extending actuating lug 76 which engages in a groove 62 extending angularly around the cylinder 60 so that the lug 76 is positioned therein when the stop means 12 engages any one of the notches 68 to 74. It should be noted that the control means 10 is sufficiently light in weight, and preferably molded of plastic for that purpose, so as to be automatically lifted or returned to its raised position, as illustrated in FIG. 6, by the force of the spring of the timing mechanism as that spring drives the crank arm 32 in a counterclockwise direction, as seen in FIG. 6, and to assist such upward movement of the control means 10 there further is provided a coiled spring 63 under compression within the upper end of the hollow cylinder 60 and bearing against the upper end of the stud 56.

The stop means 12 preferably comprises a small calibrating pin or rod 78 having its lower end externally threaded, as at 80, and received in an internally threaded bushing or sleeve 82 press-fit in an opening in the support block 26. The pin 78 extends generally parallel to the axis of the guide stud or pin 56 and is spaced from that axis a distance slightly greater than the radius of the bases of the notches 68 and 74 so that the pin 78 prevents rotation of the cylinder 60 as it is depressed and sufficiently contacts the upper end wall of each notch to limit the extent of depression of said cylinder in accordance with the length of the selected notch.

Adjacent to the lower end of the cylinder 60, the intervening radial walls between adjacent notches 68 and 74 are substantially reduced so that the continuations 82 to 88 of the notches 68 and 74, as illustrated in FIG. 9 are of sufficient depth to receive the stop pin 78. It should be noted that the pin 78 is sufficiently flexible and resilient that it may be cammed outwardly when the cylinder 60 is rotationally adjusted so as to pass from one shallow notch or "detent" 82 to 88 to another and yet prevent accidental turning of the cylinder 60. It should be noted also that the notches 68 and 74 are each of a depth sufficient in relation to the diameter of the pin 78 to completely prevent any turning of the cylinder 60 when the pin 78 engages therewith, as illustrated in FIG. 8.

The one-piece molded housing or cover 4 is also formed of a butyrate plastic having an outer side wall 90, end walls 92 and 94, an inner wall 96 and a top wall 98 composed of a curved, dome shaped portion 100 and a generally flat shelf-like portion 102 joined to the portion 100 by an upstanding wall portion 104 which partially circumscribes the portion of the cylinder 60 above its annular flange 62 and thereby forms additional guide means for the cylinder, the lower edge of the wall portion 104 and the shelf portion 102 of the top wall of the housing serving as stops limiting the upward movement of the cylinder. It should be noted that the crank arm 32 is fixed to the shaft 54 in such angular position relative thereto that when the shaft is in zero timing position the lug 76 at the outer end of the crank arm 32 engages the upper surface of the annular slot 62 of the cylinder 60.

The housing or cover 4 is provided in its side walls 90, 92 and 94 with openings 106, 108 and 110 respectively, see FIGS. 1, 3, 4 and 6, to receive latching projections 112, 114 and 116 integrally formed on the rim 24 and the outer wall of the support block 26, the latching projections being formed with downwardly and outwardly inclined surfaces for outwardly camming the walls of the housing below the notches 106 to 110 so that the housing or cover may be snapped over the latching projections.

It should be noted that the side wall 96 is formed with a recess 118 in its lower edge so that the housing or cover snugly fits over the plate-like member 14 of the base 2.

Figures 2, 3:
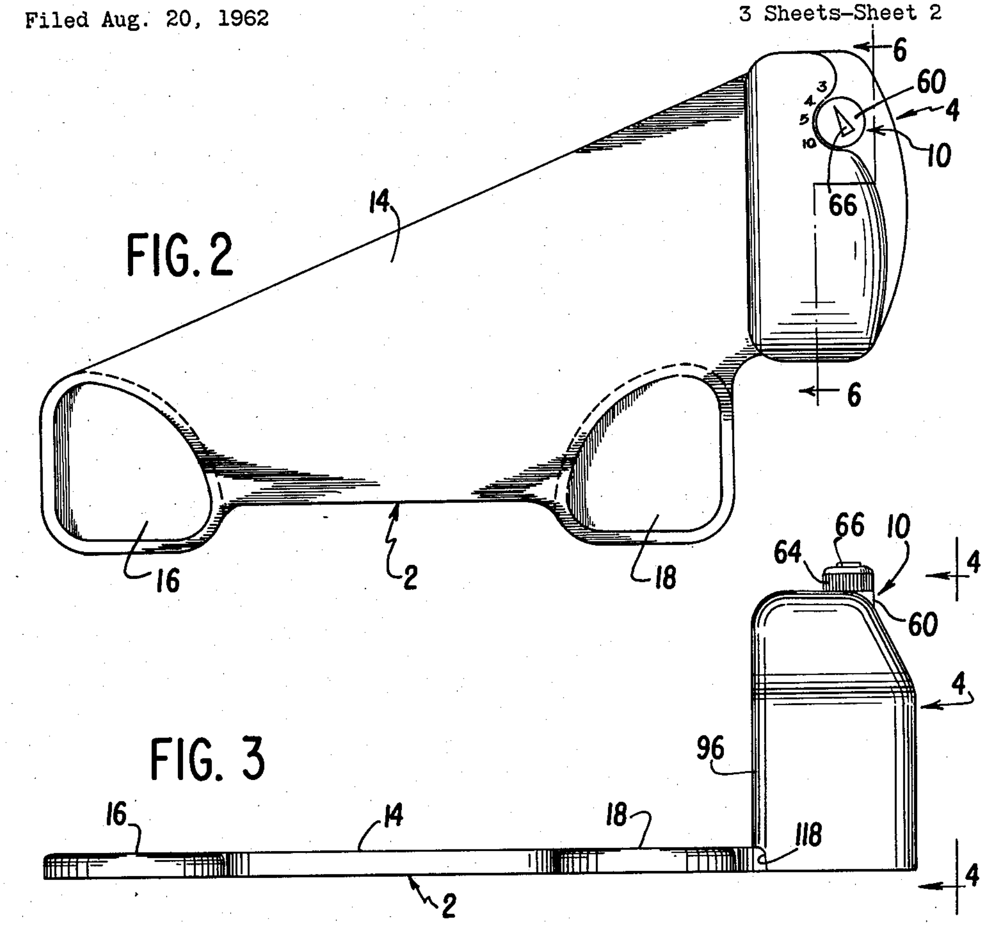
FIG. 2 is a plan view of the timer of FIG. 1.
FIG. 3 is a view in vertical elevation of the timer of FIG. 1.

The portion 100 of the top wall 98 may be inscribed, etched, embossed or otherwise provided with a suitable timing scale, as illustrated in FIG. 2, to cooperate with the pointer 66 of the control means 10 to indicate the proper position of rotational adjustment of the control means for the desired timing interval. As illustrated in the drawings, the timer may be calibrated for three, four, five or ten minute timing intervals, although it would be evident that by increasing the number of notches 68 to 74 in the lower portion of the cylinder 60, by varying the proportionate lengths of the lower portion of the cylinder and the height of the stop pin 78, and by varying the length of the crank arm 32 and the spacing between the axis of the guide pin 56 and the shaft 54 of the timer mechanism additional timer intervals, either shorter or intermediate or longer than those illustrated, may be provided.

Figures 4, 4A, 5:
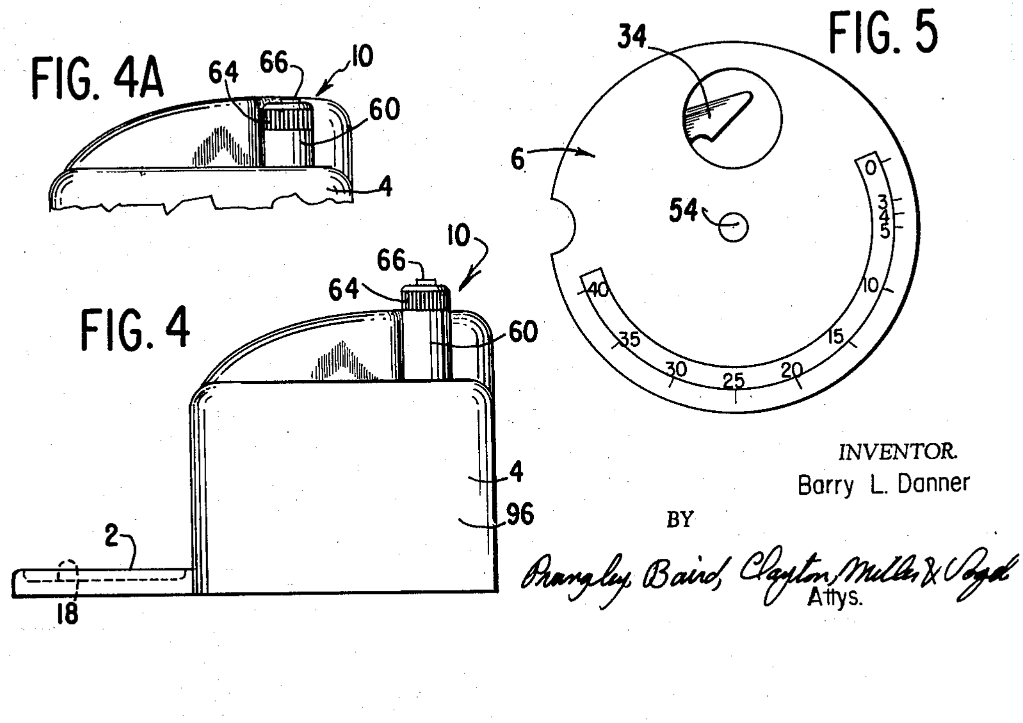
FIG. 4 is a view and side elevation as seen in the direction of the arrows along the line 4—4 of FIG. 3.
FIG. 4A is a fragmentary view similar to FIG. 4 and showing the actuator in the lower or timing position thereof.
FIG. 5 is a view in vertical elevation of a timing mechanism employed in the timer of FIGS. 1, 3 and 4.

In operation, the timer being positionally associated with the telephone stand 20, as illustrated in FIG. 1, so that the control means 10 is always available for substantially instantaneous operation by the user of the telephone, the user will first rotate the cylinder or button 60 so that the pointer 66 indicates the desired time interval to be pre-selected. When the call is completed, as for example when the called party answers, the user simply depresses and then releases the cylinder or button 60, the button having been rotationally pre-positioned to align the appropriate notch 68 to 74 with the stop pin 78, according to the selected time interval; such depression of the button, as far as permitted by the stop pin, serves to move the crank arm 32 in a clockwise direction, as seen in FIG. 6, thereby winding the spring of the timing mechanism and upon subsequent release thereof initiating the timing interval during which the crank arm is automatically returned in a counterclockwise direction, as seen in FIG. 4, and in cooperation with the spring 63 to raise also the operating button. A few seconds before the crank arm returns to its zero time position, the clapper 34 is automatically released and vibrates between the anvils 36 and 37 to provide a discrete audible indication that the pre-selected time interval has elapsed or is about to elapse. If the user wishes to continue the call for an additional period, of the same pre-selected length, he may simply again depress the button 60 without in any fashion interrupting the call, and if he desires to extend the call for an additional but different period, the user merely rotates the button to the desired additional time interval, as indicated by the scale at the top of the timer and again depresses the button, still without interfering or interrupting the call or the conversation.

When the actuator 10 is depressed as illustrated in FIG. 4A of the drawings, there is not sufficient surface of the upper portion of the cylinder 60 available to permit grasping thereof by the user and it therefor is not possible to change the pre-selected timing interval at this point in the cycle of operation of the timer. More particularly, the plastic material from which the actuator 10 is made grips the stud 56 so tightly that a firm grip must be obtained on the knurled portion 64 if the actuator 10 is to be moved upwardly under the joint action of the timer spring acting through the arm 32 and the coiled spring 63 (see FIG. 6).

Although there has been described what is presently considered to be a preferred embodiment of the present invention, it is to be understood that various changes and modifications can be made therein without departing from the spirit and scope thereof, and it is intended to cover in the appended claims all such changes and modifications as fall within the true spirit and scope of the invention.

What is claimed is:

1. A telephone timer comprising a base including structure for mounting adjacent to an associated telephone, a timing mechanism mounted on said base and including a timing shaft rotatable from a rest position in a first direction for setting a selected time interval thereon and rotatable in the opposite direction throughout the pre-set time interval and spring means connected to said shaft for moving said shaft in said opposite direction at a controlled rate of movement thereof throughout the selected time interval, and actuating arm connected to said timing shaft and movable therewith, an upstanding stud mounted on said base, an actuator having an opening receiving said stud therein for mounting said actuator upon said stud for rotational movement about the axis thereof and for longitudinal movement along the axis thereof, means responsive to rotational movement of said actuator to select a desired time interval, means responsive to longitudinal movement of said actuator to move said actuating arm and the connected timing shaft to a position corresponding to the pre-selected time interval, and a signal device operated in response to the return of said timing shaft to the rest position thereof to signal the end of the pre-selected time interval.

2. A telephone timer comprising a base including structure for mounting adjacent to an associated telephone, a timing mechanism mounted on said base and including a timing shaft rotatable from a rest position in a first direction for setting a selected time interval thereon and rotatable in the opposite direction throughout the pre-set time interval and spring means connected to said shaft for moving said shaft in said opposite direction at a controlled rate of movement thereof throughout the selected time interval, an actuating arm connected to said timing shaft and movable therewith, an upstanding cylindrical stud mounted on said base adjacent to said timing mechanism, an actuator having a cylindrical opening receiving said stud therein for mounting said actuator upon said stud for rotational movement about the axis thereof and for longitudinal movement along the axis thereof, said actuator having a plurality of longitudinally extending recesses of varying lengths corresponding to desired time intervals formed on the periphery thereof, a pin mounted on said base and adapted to engage in one of said recesses upon rotational movement of said actuator to select a desired time interval, said actuator having a circumferential recess therein receiving said actuating arm therein so that longitudinal movement of said actuator from its rest position towards said base until the end of said pin reaches the end of the selected recess places said actuating arm and the connected timing shaft in a position corresponding to the pre-selected time interval, operation of said timing mechanism moving said actuator upwardly to its rest position during the selected time interval, and a signal device operated in response to the return of said timing shaft to the rest position thereof to signal the end of the pre-selected time interval.

3. The telephone timer set forth in claim 2, wherein the upper end of said actuator is knurled to facilitate rotational movement thereof, and a spring is provided between said stud and said actuator to assist in the movement of said actuator from the actuated position thereof to the rest position thereof under the control of said timing mechanism.

References Cited in the file of this patent

UNITED STATES PATENTS

| | | |
|---|---|---|
| 2,113,275 | Manuel | Apr. 5, 1938 |
| 2,588,862 | Mayo | Mar. 11, 1952 |
| 2,673,516 | Reichold | Mar. 30, 1954 |
| 3,018,613 | Jaccard | Jan. 30, 1962 |
| 3,089,303 | Dahl | May 14, 1963 |

FOREIGN PATENTS

| | | |
|---|---|---|
| 41,474 | Germany | Nov. 10, 1887 |
| 120,399 | Germany | May 11, 1901 |